US012683154B2

(12) United States Patent
Lee et al.

(10) Patent No.: US 12,683,154 B2
(45) Date of Patent: Jul. 14, 2026

(54) ELECTRODE ASSEMBLY FOR LITHIUM SECONDARY BATTERY, AND LITHIUM SECONDARY BATTERY COMPRISING SAME

(71) Applicant: LG Energy Solution, Ltd., Seoul (KR)

(72) Inventors: Su Min Lee, Daejeon (KR); Sang Seung Oh, Daejeon (KR); Hye Hyeon Kim, Daejeon (KR); Chi Ho Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 647 days.

(21) Appl. No.: 18/023,777

(22) PCT Filed: May 6, 2022

(86) PCT No.: PCT/KR2022/006456

§ 371 (c)(1),
(2) Date: Feb. 28, 2023

(87) PCT Pub. No.: WO2022/250325

PCT Pub. Date: Dec. 1, 2022

(65) Prior Publication Data

US 2023/0343948 A1 Oct. 26, 2023

(30) Foreign Application Priority Data

May 26, 2021 (KR) ........................ 10-2021-0067353

(51) Int. Cl.

| | |
|---|---|
| ***H01M 4/505*** | (2010.01) |
| ***H01M 4/131*** | (2010.01) |
| ***H01M 4/133*** | (2010.01) |
| ***H01M 4/134*** | (2010.01) |
| ***H01M 4/38*** | (2006.01) |
| ***H01M 4/525*** | (2010.01) |
| ***H01M 4/587*** | (2010.01) |
| ***H01M 10/052*** | (2010.01) |

(52) U.S. Cl.

CPC ........... *H01M 4/505* (2013.01); *H01M 4/131* (2013.01); *H01M 4/133* (2013.01); *H01M 4/134* (2013.01); *H01M 4/386* (2013.01); *H01M 4/525* (2013.01); *H01M 4/587* (2013.01); *H01M 10/052* (2013.01)

(58) Field of Classification Search

CPC ...... H01M 4/131; H01M 4/133; H01M 4/134; H01M 4/364; H01M 4/386; H01M 4/483; H01M 4/505; H01M 4/525; H01M 4/587; H01M 4/625; H01M 10/052; H01M 10/0525

USPC .......................................................... 429/223

See application file for complete search history.

(56) References Cited

U.S. PATENT DOCUMENTS

| | | | | |
|---|---|---|---|---|
| 2014/0220455 | A1 | 8/2014 | Lee et al. | |
| 2015/0340692 | A1* | 11/2015 | Park ...................... | H01M 4/386 429/223 |
| 2015/0372304 | A1* | 12/2015 | Hasegawa ............. | H01M 4/131 429/231.95 |
| 2016/0133933 | A1 | 5/2016 | Choi et al. | |
| 2018/0309159 | A1 | 10/2018 | Hori | |
| 2019/0013540 | A1* | 1/2019 | Oh ........................ | H01M 4/621 |
| 2019/0165412 | A1 | 5/2019 | Jeon et al. | |
| 2020/0227723 | A1 | 7/2020 | Wang et al. | |
| 2020/0266447 | A1 | 8/2020 | Kim et al. | |
| 2022/0255060 | A1 | 8/2022 | Oh et al. | |

FOREIGN PATENT DOCUMENTS

| | | | |
|---|---|---|---|
| CN | 107104245 | A | 8/2017 |
| CN | 110224169 | A | 9/2019 |
| CN | 111213269 | A | 5/2020 |
| EP | 3651247 | A1 | 5/2020 |
| JP | 2015088268 | A | 5/2015 |
| JP | 2018185905 | A | 11/2018 |
| JP | 2019046689 | A | 3/2019 |
| JP | 201996561 | A | 6/2019 |
| JP | 2019145402 | A | 8/2019 |
| KR | 20130079109 | A | 7/2013 |
| KR | 20140113319 | A | 9/2014 |
| KR | 101724004 | B1 | 4/2017 |
| KR | 101753214 | B1 | 7/2017 |
| KR | 20180023696 | A | 3/2018 |
| KR | 20190064424 | A | 6/2019 |
| KR | 20190078392 | A | 7/2019 |
| KR | 2020-0065951 | A | 6/2020 |
| KR | 20210016799 | A | 2/2021 |

(Continued)

OTHER PUBLICATIONS

Carlier, D., et al. Transferred Hyperfine Interaction between a Tetrahedral Transition Metal and Tetrahedral Lithium: Li6Co04. The Journal of Physical Chemistry C, 2010, 114, 4749-4755. Abstract and p. 4750; par. 6 (Year: 2010).*

(Continued)

*Primary Examiner* — James M Erwin
*Assistant Examiner* — Gilberto Ramos Rivera
(74) *Attorney, Agent, or Firm* — Lerner David LLP

(57) ABSTRACT

An electrode assembly for a lithium secondary battery and a positive electrode for the lithium secondary battery including the electrode assembly. By controlling a ratio ($CR_{Lip}/CR_{Si}$) between a content percentage of a positive electrode additive and a silicon (Si)-containing material that is a negative electrode active material, which are contained in a positive electrode mixture layer and a negative electrode mixture layer, respectively, to a specific range, the electrode assembly has an advantage in that high charging/discharging capacity and charging/discharging efficiency can be realized during initial charging/discharging, a capacity retention rate can be excellent during subsequent charging/discharging, and a lithium secondary battery including the electrode assembly can exhibit a high energy density and long lifetime.

12 Claims, No Drawings

(56) References Cited

FOREIGN PATENT DOCUMENTS

| | | | | | |
|---|---|---|---|---|---|
| KR | 20210055586 | A | | 5/2021 | |
| WO | 2015016548 | A1 | | 2/2015 | |
| WO | 2017183653 | A1 | | 10/2017 | |
| WO | WO-2019078690 | A2 | * | 4/2019 | ........... C01B 33/113 |

OTHER PUBLICATIONS

WO 2019078690 A2-Machine translation, retrieved on Oct. 2025 (Year: 2025).*

Kuang et al. Thick Electrode Batteries: Principles, Opportunities and Challenges. Advanced Energy Materials, 2019, 9, 1-19. p. 2; par. 1 (Year: 2019).*

International Search Report for PCT/KR2022/006456 mailed Aug. 17, 2022. 3 pgs.

Extended European Search Report including Written Opinion for Application No. 22811518.4 dated Jul. 15, 2024, pp. 1-9.

Noh, Mijung et al: "Role of Li6CoO4 Cathode Additive in Li-Ion Cells Containing Low Coulombic Efficiency Anode Material", Journal of the Electrochemical Society, Jul. 2012, pp. 1329-1334, vol. 159, No. 8, XP055342824, DOI: 10.1149/2.085208jes.

Search Report dated Apr. 29, 26 from the Office Action for Chinese Application No. 202280005796.2 issued Apr. 30, 26, pp. 1-3.

* cited by examiner

ELECTRODE ASSEMBLY FOR LITHIUM SECONDARY BATTERY, AND LITHIUM SECONDARY BATTERY COMPRISING SAME

CROSS-REFERENCE TO RELATED APPLICATIONS

The present application is a national phase entry under 35 U.S.C § 371 of International Application No. PCT/KR2022/006456 filed on May 6, 2022 which claims priority from Korean Patent Application No. 10-2021-0067353, filed on May 26, 2021, all of which are incorporated herein by reference.

TECHNICAL FIELD

The present disclosure relates to an electrode assembly for a lithium secondary battery and a lithium secondary battery including the same.

BACKGROUND ART

Recently, as there is a growing interest in environmental issues, research has been carried out on electric vehicles (EVs) and hybrid EVs (HEVs) which can replace vehicles using fossil fuels, such as gasoline vehicles and diesel vehicles, which are one of the major causes of air pollution. Although nickel-metal hydride (Ni-MH) secondary batteries are mainly used as power sources for EVs and HEVs, research is actively carried out on the use of a lithium secondary battery having a high energy density, a high discharge voltage, and output stability, and some of the lithium secondary batteries are commercialized.

Graphite is mainly used for a negative electrode material of the lithium secondary battery. However, since the graphite has a small capacity per unit mass of 372 mAh/g, it is difficult to achieve a high capacity of the lithium secondary battery. Accordingly, in order to achieve the high capacity of the lithium secondary battery, as a non-carbon-based negative electrode material having a higher energy density than the graphite, a negative electrode material forming an intermetallic compound with lithium, such as silicon, tin, and an oxide thereof, has been developed and used. However, such a non-carbon-based negative electrode material has a problem in that, although a capacity is large, initial efficiency is low and thus lithium consumption is large during initial charging and discharging and loss of an irreversible capacity is large.

In addition, a lithium-containing cobalt oxide ($LiCoO_2$) is mainly used as a positive electrode material of the lithium secondary battery. In addition to $LiCoO_2$, the use of a lithium-containing manganese oxide, such as $LiMnO_2$ having a layered crystal structure or $LiMn_2O_4$ having a spinel crystal structure, and lithium-containing nickel oxide ($LiNiO_2$) is also being considered.

However, although $LiCoO_2$ is currently widely used due to its excellent physical properties such as excellent cycle characteristics, it has low safety, and $LiCoO_2$ is expensive due to the resource limitation of cobalt as a raw material and thus has a limitation in being using in large quantities as a power source in a field including EVs. In addition, it is difficult to apply $LiNiO_2$ to an actual mass production process at a reasonable cost due to the characteristics of a manufacturing method of $LiNiO_2$, and since lithium plating is induced on the negative electrode due to a gas generated during charging and discharging, there is a limitation in that a charging and discharging capacity is lowered as well as safety.

DISCLOSURE

Technical Problem

An object of the present technology is to provide a lithium secondary battery with high energy density and an excellent battery lifetime.

Technical Solution

The present technology is directed to solving the above-described problem and provides an electrode assembly for a lithium secondary battery, which includes a positive electrode in which a positive electrode mixture layer includes a positive electrode active material and a positive electrode additive represented by the following Chemical Formula 1, a negative electrode in which a negative electrode mixture layer includes a carbon material and a silicon (Si)-containing material as a negative electrode active material, and a separator located between the positive electrode and the negative electrode, wherein a content of the positive electrode additive is 0.01 to 5 parts by weight based on 100 parts by weight of the positive electrode mixture layer, a ratio ($CR_{Lip}/CR_{Si}$) between a content percentage of the positive electrode additive ($CR_{Lip}$) based on a total weight of the positive electrode mixture layer and a content percentage of the Si-containing material ($CR_{Si}$) based on the total weight of the negative electrode mixture layer ranges from 0.03 to 0.30.

$$Li_pCo_{(1-q)}M^1_qO_4 \quad \text{Chemical Formula 1}$$

In Chemical Formula 1, $M^1$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \le p \le 7$ and $0 \le q \le 0.5$, respectively.

In this case, the ratio ($CR_{Lip}/CR_{Si}$) between the content percentage of the positive electrode additive ($CR_{Lip}$) based on the total weight of the positive electrode mixture layer and the content percentage of the Si-containing material ($CR_{Si}$) based on the total weight of the negative electrode mixture layer may range from 0.05 to 0.20.

The positive electrode additive may have a tetragonal structure with a space group of $P4_2/nmc$.

The positive electrode active material may be a lithium metal composite oxide represented by the following Chemical Formula 2.

$$Li_x[ni_yCo_zMn_wM^2_v]O_u \quad \text{Chemical Formula 2}$$

In Chemical Formula 2, $M^2$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v, and u are $1.0 \le x \le 1.30$, $0 \le y < 0.95$, $0 < z \le 0.5$, $0 < w \le 0.5$, $0 \le v \le 0.2$, and $1.5 \le u \le 4.5$, respectively.

The carbon material may include one or more selected from the group consisting of natural graphite, artificial graphite, graphene, and carbon nanotubes, and the Si-containing material may include one or more among Si, silicon monoxide (SiO), and silicon dioxide ($SiO_2$).

The carbon material may include one or more of graphene and carbon nanotubes included in an amount of 0.1 to 10 parts by weight based on 100 parts by weight of the total amount of the carbon material.

The positive electrode mixture layer may include 0.1 to 5 parts by weight of a conductive material based on the total weight.

The positive electrode mixture layer may include one or more conductive materials selected from the group consisting of natural graphite, artificial graphite, carbon black, acetylene black, Ketjen black, and a carbon fiber.

An average thickness of the positive electrode mixture layer may range from 5 μm to 300 μm, an average thickness of the negative electrode mixture layer may range from 100 μm to 300 μm.

An average area ratio of the negative electrode mixture layer and the positive electrode mixture layer may range 1.0 to 1.1.

The present technology is directed to solving the above-described problem and provides a lithium secondary battery including the above-described electrode assembly.

Advantageous Effects

In accordance with an electrode assembly for a lithium secondary battery according to the present technology, by controlling a ratio ($CR_{Lip}/CR_{Si}$) between a content percentage of a positive electrode additive and a silicon (Si)-containing material that is a negative electrode active material, which are contained in a positive electrode mixture layer and a negative electrode mixture layer, respectively, within a specific range, there is an advantage in that high charging/discharging capacity and charging/discharging efficiency can be realized during initial charging/discharging, a capacity retention rate can be excellent during subsequent charging/discharging, and a lithium secondary battery including the electrode assembly can exhibit a high energy density and long lifetime.

BEST MODE

The present disclosure may be modified into various forms and may have a variety of embodiments, and therefore, specific embodiments will be described in detail.

However, the embodiments are not to be taken in a sense which limits the present disclosure to the specific embodiments and should be construed to include all modifications, equivalents, or substituents falling within the spirit and technical scope of the present invention.

In the present disclosure, the terms "comprising," "having," and the like are used to specify the presence of a feature, a number, a step, an operation, a component, an element, or a combination thereof described herein, and they do not preclude the presence or addition of one or more other features, numbers, steps, operations, components, elements, or combinations thereof.

In addition, in the present disclosure, when a portion of a layer, a film, a region, a plate, or the like is described as being "on" another portion, this includes not only a case in which the portion is "directly on" another portion but also a case in which still another portion is present between the portion and another portion. Conversely, when a portion of a layer, a film, a region, a plate, or the like is described as being "under" another portion, this includes not only a case in which the portion is "directly under" another portion but also a case in which still another portion is present between the portion and another portion. In addition, in this application, being disposed "on" may include the case of being disposed not only on an upper portion but also on a lower portion.

Hereinafter, the present invention will be described in more detail.

Electrode Assembly for Lithium Secondary Battery

In an embodiment, the present disclosure provides an electrode assembly for a lithium secondary battery, which includes a positive electrode in which a positive electrode mixture layer includes a positive electrode active material and a positive electrode additive represented by the following Chemical Formula 1, a negative electrode in which a negative electrode mixture layer includes a carbon material and a silicon (Si)-containing material as a negative electrode active material, and a separator located between the positive electrode and the negative electrode, wherein a content of the positive electrode additive ranges from 0.01 to 5 parts by weight based on 100 parts by weight of the positive electrode mixture layer, a ratio $CR_{Lip}/CR_{Si}$ between a content percentage of the positive electrode additive $CR_{Lip}$ based on the total weight of the positive electrode mixture layer and a content percentage of the Si-containing material $CR_{Si}$, based on the total weight of the negative electrode mixture layer ranges from 0.03 to 0.30.

$$Li_pCo_{(1-q)}M^1_qO_4 \quad \text{Chemical Formula 1}$$

In Chemical Formula 1, $M^1$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \leq p \leq 7$ and $0 \leq q \leq 0.5$, respectively.

The electrode assembly for a lithium secondary battery according to the present technology has a structure including a positive electrode, a negative electrode, and a separator disposed between the positive electrode and the negative electrode. In this case, the positive electrode has a form in which the positive electrode mixture layer is located on a positive electrode current collector, and the positive electrode mixture layer includes the positive electrode active material exhibiting activity and the positive electrode additive imparting an irreversible capacity. Specifically, the positive electrode active material is a positive electrode active material which is reversibly intercalated and deintercalated and may include a lithium metal composite oxide represented by the following Chemical Formula 2 as a main component:

$$Li_x[ni_yCo_zMn_wM^2_v]O_u \quad \text{Chemical Formula 2}$$

In Chemical Formula 2, $M^2$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v, and u are $1.0 \leq x \leq 1.30$, $0 \leq y < 0.95$, $0 \leq z \leq 0.5$, $0 < w \leq 0.5$, $0 \leq v \leq 0.2$, and $1.5 \leq u \leq 4.5$, respectively.

The lithium metal composite oxide represented by Chemical Formula 2 is a composite metal oxide containing lithium and nickel, and the composite metal oxide may include one or more compounds selected from the group consisting of $LiCoO_2$, $LiCo_{0.5}Zn_{0.5}O_2$, $LiCo_{0.7}Zn_{0.3}O_2$, $LiNiO_2$, $LiNi_{0.5}Co_{0.5}O_2$, $LiNi_{0.6}Co_{0.4}O_2$, $LiNi_{1/3}Co_{1/3}Al_{1/3}O_2$, $LiMnO_2$, $LiNi_{1/3}Co_{1/3}Mn_{1/3}O_2$, $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, and $LiNi_{0.7}Co_{0.1}Mn_{0.1}Al_{0.1}O_2$.

As an example, as the positive electrode active material that is a lithium metal composite oxide represented by Chemical Formula 2, $LiNi_{1/3}Co_{1/3}Mn_{1/3}O_2$, $LiNi_{0.8}Co_{0.1}Mn_{0.1}O_2$, or $LiNi_{0.6}Co_{0.2}Mn_{0.2}O_2$, alone or a combination thereof may be used.

In addition, a content of the positive electrode active material may range from 85 to 95 parts by weight based on 100 parts by weight of the positive electrode mixture layer, and specifically, may range from 88 to 95 parts by weight, 90 to 95 parts by weight, 86 to 90 parts by weight, or 92 to 95 parts by weight.

In addition, the positive electrode mixture layer includes the positive electrode additive represented by the following Chemical Formula 1.

$Li_pCo_{(1-q)}M^1_qO_4$ Chemical Formula 1

In Chemical Formula 1, $M^1$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \le p \le 7$ and $0 \le q \le 0.5$, respectively.

The positive electrode additive may contain Li in excess and may provide Li for lithium consumption generated by an irreversible chemical and physical reaction at the negative electrode during initial charging, and thus a charging capacity of the battery is increased and the irreversible capacity is reduced so that lifetime characteristics may be improved.

Among the additives, the positive electrode additive represented by Chemical Formula 1 has a higher lithium ion content than a nickel-containing oxide which is commonly used in the art. Accordingly, during initial activation of the battery, since the positive electrode additive represented by Chemical Formula 1 may replenish the lithium consumed due to the irreversible chemical and physical reaction, which occurs at the negative electrode containing a Si-based material (e.g., Si, $SiO_q$ (here, $0.8 \le q \le 2.2$), or the like) as the negative electrode active material, the charging/discharging capacity of the battery can be significantly improved. In addition, when compared to iron and/or manganese-containing oxide commonly used in the art, since there is no side reaction occurring due to elution of a transition metal during charging and discharging of the battery, there is an advantage of excellent battery stability. The lithium metal oxide represented by Chemical Formula 1 may include $Li_6Coo_4$, $Li_6Co_{0.5}Zn_{0.5}O_4$, $Li_6Co_{0.7}Zn_{0.3}O_4$, or the like.

In addition, the positive electrode additive represented by Chemical Formula 1 may have a tetragonal crystal structure, and among tetragonal crystal structures, the positive electrode additive may be included in a space group of $P4_2/nmc$ having a twisted tetrahedral structure formed by a cobalt element and an oxygen element.

In addition, a content of the positive electrode additive may be less than or equal to 5 wt % based on the total weight of the positive electrode active material, and specifically, may be 0.01 to 5 wt %, 0.01 to 4 wt %, 0.01 to 3 wt %, 0.01 to 2 wt %, 0.01 to 1 wt %, 0.1 to 0.9 wt %, 0.3 to 0.9 wt %, 0.2 to 0.7 wt %, 0.5 to 0.9 wt %, 0.01 to 0.5 wt %, 0.1 to 0.4 wt %, 1 to 5 parts by weight, 2 to 4 parts by weight, 0.1 to 2.5 parts by weight, 0.1 to 1 part by weight, or 0.5 to 2.5 parts by weight.

Further, in addition to the positive electrode active material and the positive electrode additive, the positive electrode mixture layer may further include a conductive material, a binder, and other additives.

In this case, the conductive material may be used to improve the electrical performance of the positive electrode, and one or more carbon-based materials selected from the group consisting of natural graphite, artificial graphite, carbon black, acetylene black, Ketjen black, and carbon fiber may be used as the conductive material. For example, the conductive material may include acetylene black.

In addition, the conductive material may be included in an amount of 0.1 to 5 parts by weight based on 100 parts by weight of the positive electrode mixture layer, and specifically, may be included in an amount of 1 to 4 parts by weight, 2 to 4 parts by weight, 1.5 to 5 parts by weight, or 1 to 3 parts by weight.

In addition, the binder may include at least one resin selected from the group consisting of a polyvinylidene fluoride-hexafluoropropylene copolymer (PVdF-co-HFP), polyvinylidene fluoride (PVdF), polyacrylonitrile, polymethylmethacrylate, and a copolymer thereof. As an example, the binder may include polyvinylidene fluoride.

In addition, the binder may be included in an amount of 1 to 10 parts by weight based on 100 parts by weight of the mixture layer, and specifically, may be included in an amount of 2 to 8 parts by weight, 2 to 6 parts by weight, or 2 to 4 parts by weight.

In addition, as the positive electrode current collector in the positive electrode, a material having high conductivity without causing a chemical change in the battery may be used. For example, stainless steel, aluminum, Ni, titanium, or calcined carbon may be used, and in the case of using aluminum or stainless steel, one whose surface is treated with carbon, Ni, titanium, or silver may be used. In addition, fine irregularities may be formed on a surface of the positive electrode current collector to enhance a bonding force of the positive electrode active material, and a positive electrode current collector in any form such as a film, a sheet, a foil, a net, a porous body, a foam, or a nonwoven fabric may be used. In addition, an average thickness of the positive electrode current collector may be appropriately applied in the range of 1 μm to 500 μm in consideration of the conductivity and total thickness of the positive electrode to be manufactured.

Meanwhile, the negative electrode is provided with a negative electrode mixture layer formed by applying, drying, and pressing the negative electrode active material on the negative electrode current collector, and an organic binder polymer, an additive, and the like as in the positive electrode may be further selectively included in the negative electrode mixture layer.

Here, the negative electrode active material may include a carbon material and a Si-containing material. The carbon material means a carbon material containing carbon atoms as a main component. The carbon material may include one or more selected from the group consisting of graphite with a completely layered crystal structure as natural graphite, soft carbon with a low crystallinity layered crystal structure (a graphene structure is a structure in which hexagonal honeycomb planes of carbon are disposed in layers), hard carbon in which these structures are mixed with amorphous portions, artificial graphite, expanded graphite, carbon fiber, non-graphitized carbon, carbon black, acetylene black, Ketjen black, carbon nanotubes, fullerenes, activated carbon, graphene, and carbon nanotubes. More preferably, the carbon material may further include natural graphite and/or artificial graphite and may include any one or more of graphene and carbon nanotubes together with the natural graphite and/or the artificial graphite. In this case, the carbon material may include graphene and/or carbon nanotubes at 0.1 to 10 parts by weight based on 100 parts by weight of the total amount of the carbon material, and more specifically, the carbon material may include graphene and/or carbon nanotubes at 0.1 to 5 parts by weight or 0.1 to 2 parts by weight based on 100 parts by weight of the total carbon material.

In addition, the Si-containing material is a material, which contains Si as a main component, as a metal component, and the Si-containing material may include Si, SiO, or $SiO_2$ alone or a combination thereof. When SiO and $SiO_2$ are uniformly mixed or complexed and included in the negative electrode mixture layer as the silicon Si-containing material, SiO and $SiO_2$ may be expressed as silicon oxide ($SiO_x$) (here, 1≤x≤2). In addition, when the Si-containing material has a form in which SiO particles and $SiO_2$ particles are uniformly mixed, each particle may have the form of a crystalline particle, and when the SiO particles and the $SiO_2$ particles have a complex form, each particle may have the form of a crystalline particle or an amorphous particle. In this case, a proportion of the amorphous particles ranges from 50 to 100 parts by weight, and specifically, 50 to 90 parts by weight, 60 to 80 parts by weight, or 85 to 100 parts by weight based on 100 parts by weight of the total amount of the silicon material. In the present technology, the proportion of the amorphous particles contained in the silicon material is controlled to the above range so that thermal stability and flexibility can be improved without degradation of electrical properties of the electrode.

In addition, the negative electrode active material may include the carbon material and the Si-containing material and may include the carbon material at 75 to 99 parts by weight and the Si-containing material at 1 to 25 parts by weight based on 100 parts by weight of the total amount. More specifically, based on 100 parts by weight of the total amount, the negative electrode active material may include the carbon material at 80 to 95 parts by weight and the Si-containing material at 5 to 20 parts by weight, the carbon material at 90 to 97 parts by weight and the silicon Si-containing material at 3 to 10 parts by weight, the carbon material at 85 to 92 parts by weight and the Si-containing material at 8 to 15 parts by weight, the carbon material at 82 to 87 parts by weight and the Si-containing material at 13 to 18 parts by weight, or the carbon material at 93 to 98 parts by weight and the silicon Si-containing material at 2 to 7 parts by weight. In the present technology, the content of the carbon material and the Si-containing material included in the negative electrode active material is adjusted to the above ranges so that it is possible to improve a charging capacity per unit mass while reducing Li consumption and irreversible capacity loss during the initial charging and discharging of the battery.

In addition, the negative electrode mixture layer may further include the conductive material, the binder, and other additives, which are described above in the positive electrode mixture layer, as necessary.

Specifically, together with the negative electrode active material, the negative electrode mixture layer may include one or more conductive materials selected from the group consisting of carbon black, acetylene black, Ketjen black, carbon fiber, graphene, carbon nanotubes (e.g., single-walled carbon nanotubes (SWCNTs), and multi-walled carbon nanotubes (MWCNTs). For example, the conductive material may include acetylene black.

In addition, the conductive material may be included in an amount of 0.1 to 10 parts by weight based on 100 parts by weight of the negative electrode mixture layer, and specifically, may be included in an amount of 0.1 to 8 parts by weight, 0.1 to 5 parts by weight, or 0.5 to 2 parts by weight.

In addition, the binder is for adhering the negative electrode active materials and may be any one or a mixture of two or more among, for example, polyvinylidene fluoride (PVDF), polyacrylic acid (PAA), polymethacrylic acid (PMAA), styrene-butadiene rubber (SBR), and carboxymethyl cellulose (CMC).

In addition, a content of the binder may range from 0.5 to 5 parts by weight based on 100 parts by weight of the negative electrode active material, and specifically, 0.5 to 4 parts by weight, or 1 to 3 parts by weight.

In addition, the negative electrode current collector is not particularly limited as long as a material has high conductivity without causing a chemical change in the battery, and for example, copper, stainless steel, Ni, titanium, or calcined carbon may be used for the negative electrode current collector, and in the case of using copper or stainless steel, one whose surface is treated with carbon, nickel, titanium, or silver may be used. In addition, like the positive electrode current collector, fine irregularities may be formed on a surface of the negative electrode current collector to enhance a bonding force with the negative electrode active material, and a negative electrode current collector in various forms such as a film, a sheet, a foil, a net, a porous body, a foam, and nonwoven fabric may be used. In addition, an average thickness of the negative electrode current collector may be appropriately applied in the range of 1 μm to 500 μm in consideration of the conductivity and total thickness of the negative electrode to be manufactured.

Meanwhile, in the electrode assembly for a lithium secondary battery according to the present technology, an average thickness of each mixture layer constituting the positive electrode and the negative electrode and/or an average area ratio between the mixture layers may be controlled in a predetermined range.

Specifically, an average thickness of the positive electrode mixture layer may range from 50 μm to 300 μm, and more specifically, from 100 μm to 200 μm, from 80 μm to 150 μm, from 120 μm to 170 μm, from 150 μm to 300 μm, from 200 μm to 300 μm, from 150 μm to 190 μm, from 130 μm to 160 μm, from 100 μm to 150 μm, or 110 μm to 160 μm.

In addition, the negative electrode mixture layer may have an average thickness ranging from 100 μm to 300 μm and more specifically, from 100 μm to 250 μm, from 100 μm to 200 μm, from 100 μm to 180 μm, from 100 μm to 150 μm, from 120 μm to 200 μm, from 140 μm to 200 μm, or from 140 μm to 160 μm.

In addition, a ratio NA/PA of an average area NA of the negative electrode mixture layer to an average area PA of the positive electrode mixture layer may range from 1.0 to 1.1, and specifically, from 1.0 to 1.08, from 1.0 to 1.06, from 1.0 to 1.04, from 1.02 to 1.1, from 1.04 to 1.1, from 1.06 to 1.1, from 1.02 to 1.08, or from 1.04 to 1.06.

According to the present technology, by controlling the average thickness and/or the average area ratio of the positive electrode mixture layer and the negative electrode mixture layer in the above range(s), during repeated charging and discharging of the lithium secondary battery, a ratio of the content percentage of the positive electrode additive $CR_{Lip}$ and the content percentage of the Si-containing material $CR_{Si}$, which are contained in the positive electrode mixture layer and the negative electrode mixture layer, respectively, may be easily controlled, and high charging/discharging capacity and charging/discharging efficiency may be realized during initial charging and discharging. Specifically, when the average thickness of each of the positive electrode mixture layer and the negative electrode mixture layer exceeds 300 μm, a problem of a reduction in safety may occur during fast charging and/or overcharging of the lithium secondary battery, and when each of the average thicknesses is less than 50 μm and 100 μm, there is a limitation in that the charging/discharging capacity of the lithium secondary battery is significantly reduced. In addition, when the average thickness of the positive electrode mixture layer is excessively thick and/or the average area thereof is wide and thus the average area ratio NA/PA is less than 1.0, a significant amount of gas is generated inside the battery during charging and discharging of the lithium secondary battery and expands so that safety may be lowered. When the average thickness of the negative electrode mixture layer is excessively thick and/or the average area thereof is excessively wide and thus the average area ratio NA/PA exceeds 1.1, the irreversible capacity is significantly increased during the charging and discharging of the lithium secondary battery so that there is a limitation in that the charging/discharging capacity and an output are lowered.

In addition, in the electrode assembly for a lithium secondary battery according to the present technology, the ratio $CR_{Lip}/CR_{Si}$ between the content percentage of the positive electrode additive $CR_{Lip}$ based on the total weight of the positive electrode mixture layer and the content percentage of the Si-containing material $CR_{Si}$ based on the total weight of the negative electrode mixture layer may range from 0.03 to 0.30, and specifically, from 0.03 to 0.25, from 0.03 to 0.20, from 0.03 to 0.19, from 0.03 to 0.15, from 0.03 to 0.1, from 0.05 to 0.25, from 0.1 to 0.25, from 0.12 to 0.2, from 0.15 to 0.2, from 0.15 to 0.19, from 0.05 to 0.2, from 0.05 to 0.18, from 0.08 to 0.19, from 0.09 to 0.17, from 0.1 to 0.2, from 0.1 to 0.15, or from 0.12 to 0.18.

In the present technology, the positive electrode additive and the Si-containing material, which are contained in the positive electrode and the negative electrode, respectively, are materials participating in an irreversible reaction. According to the present technology, the ratio $CR_{Lip}/CR_{Si}$ between the content percentage of the positive electrode additive $CR_{Lip}$ and the content percentage of the Si-containing material $CR_{Si}$ based on the total weight of the negative electrode mixture layer is controlled in the above range so that high charging/discharging capacity and charging/discharging efficiency can be realized during initial charging and discharging.

In addition, the separator is interposed between the positive electrode and the negative electrode, and an insulating thin film having high ion permeability and high mechanical strength is used as the separator. The separator is not particularly limited as long as a material is generally used in the art, and specifically, a sheet or nonwoven fabric made of chemical-resistant and hydrophobic polypropylene, glass fiber, or polyethylene may be used as the separator. In some cases, a composite separator in which a porous polymer base material such as a sheet or nonwoven fabric is coated with inorganic particles/organic particles by an organic binder polymer may be used for the separator. When a solid electrolyte such as a polymer is used as the electrolyte, the solid electrolyte may also serve as the separator. In addition, the separator may have an average pore diameter ranging from 0.01 μm to 10 μm, and an average thickness ranging from 5 μm to 300 μm.

Lithium Secondary Battery

In addition, in an embodiment, the present disclosure provides a lithium secondary battery including the above-described electrode assembly.

The lithium secondary battery according to the present technology may have a structure in which the electrode assembly is impregnated with an electrolyte containing a lithium salt. Specifically, the electrode assembly may be wound in the form of a jelly roll and accommodated in a cylindrical battery, a prismatic battery, or a pouch-type battery or may be accommodated in a pouch-type battery in a folding or stack-and-folding form. Thus, when the electrode assembly is accommodated, the lithium secondary battery may be manufactured by injecting the electrolyte containing a lithium salt into the battery so that the electrode assembly is impregnated with the electrolyte.

In addition, the electrolyte containing a lithium salt according to the present technology may consist of an electrolyte and a lithium salt, and a non-aqueous organic solvent, an organic solid electrolyte, or an inorganic solid electrolyte may be used as the electrolyte.

For example, as the non-aqueous organic solvent, an aprotic organic solvent such as N-methyl-2-pyrrolidinone, ethylene carbonate, propylene carbonate, butylene carbonate, dimethyl carbonate, diethyl carbonate, gamma-butyrolactone, 1,2-dimethoxy ethane, tetrahydro[[xy]]furan, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate or ethyl propionate may be used.

For example, as the organic solid electrolyte, a polyethylene derivative, a polyethylene oxide derivative, a polypropylene oxide derivative, a phosphate ester polymer, poly agitation lysine, polyester sulfide, polyvinyl alcohol (PVA), polyvinylidene fluoride, or a polymer containing an ionic dissociation group may be used.

Nitrides, halides, sulfates of Li such as $Li_3N$, LiI, $Li_5N$ [[i]]$I_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$ may be used as the inorganic solid electrolyte.

The lithium salt is a material that is easily soluble in a non-aqueous electrolyte. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lithium lower aliphatic carboxylates, Li 4-phenylboronate, or imide may be used as the lithium salt.

In addition, for the purpose of improving charging/discharging characteristics and flame retardancy, for example, pyridine, triethylphosphite, triethanolamine, cyclic ether, ethylene diamine, n-glyme, hexaphosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the electrolyte. In some cases, in order to impart incombustibility, a halogen-containing solvent such as carbon tetrachloride and ethylene trifluoride may be further included, and in order to improve high-temperature storage characteristics, a carbon dioxide gas may be further included, and fluoro-ethylene carbonate (FEC) and propene sultone (PRS) may be further included.

Battery Module

Further, in an embodiment, the present disclosure provides a battery module including the above-described secondary battery as a unit cell is provided, and a battery pack including the battery module.

The battery pack may be used as a power source for medium-large devices requiring high-temperature stability, long cycle characteristics, and high rate characteristics. Specific examples of the medium-large devices include power tools driven by an electric motor, electric vehicles (EVs) including EVs, hybrid EVs (HEVs), and plug-in HEVs (PHEVs), electric two-wheeled vehicles including electric bicycles (E-bikes) and electric scooters (E-scooters), electric golf carts, electric trucks, or systems for power storage, and more specifically, HEVs, but the present technology is not limited thereto.

DETAILED DESCRIPTION OF THE PREFERRED EMBODIMENTS

Hereinafter, the present invention will be described in more detail with reference to examples and experimental examples.

However, the following examples and experimental examples are merely illustrative of the present invention, and the content of the present invention is not limited to the following examples and experimental examples.

Examples 1 to 6 and Comparative Examples 1 to 8

An N-methylpyrrolidone solvent was injected into a homo mixer, and in order to form the positive electrode mixture layer, $LiNi_{0.8}Co_{0.1}Mn_{0.1}O_2$ as a positive electrode active material, carbon black as a conductive material, PVdF as a binder, and $Li_6CoO_4$ as a positive electrode additive were weighed and added as shown in Tables 1 and 2 below and were mixed at 3,000 rpm for 60 minutes so that a positive electrode slurry was prepared. The prepared positive electrode slurry was applied to one surface of an aluminum current collector, dried at a temperature of 100° C., and rolled to manufacture a positive electrode. In this case, the total thickness and average area of the positive electrode mixture layer were 130 μm and 1260±50 $mm^2$, respectively, and the total thickness of the manufactured positive electrode was about 200 μm.

In addition, natural graphite and $SiO_x$ (here, $1 \le x \le 2$) particles as negative electrode active materials, a mixture of carbon black and single-walled carbon nanotubes (SWCNTs) (mixing ratio=1:1 wt/wt) as a conductive material, and SBR and carboxymethyl cellulose (CMC) as binders were prepared, and a negative electrode slurry was prepared in the same manner as preparing the positive electrode slurry with reference to Tables 1 and 2 below. In this case, the graphite used in the formation of the negative electrode mixture layer was natural graphite (an average particle size: 10 μm to 30 μm), and $SiO_x$ particles having an average particle size ranging from 3 μm to 10 μm were used. The prepared negative electrode slurry was applied to one side of a copper current collector, dried at a temperature of 100° C., and rolled to manufacture a negative electrode. In this case, the total thickness and average area of the negative electrode mixture layer were 150 μm and 1333±50 $mm^2$, respectively, and the total thickness of the manufactured negative electrode was about 250 μm.

Here, a ratio $CR_{Lip}/CR_{Si}$ between a content percentage of the positive electrode additive $CR_{Lip}$ based on the total weight of the positive electrode mixture layer and a content percentage of the $SiO_x$ particles $CR_{Si}$ based on the total weight of the negative electrode mixture layer is shown in Tables 1 and 2 below.

Then, a separator (thickness: about 16 μm) made of a porous polyethylene (PE) film was interposed between the manufactured positive electrode and the manufactured negative electrode, and E2DVC was injected as the electrolyte to manufacture a full cell-type cell.

Here, the "E2DVC" is one kind of carbonate-based electrolyte and refers to a solution in which a mixture of ethylene carbonate (EC):dimethyl carbonate (DMC):diethyl carbonate (DEC)=1:1:1 (volume ratio) is mixed with lithium hexafluorophosphate ($LiPF_6$, 1.0M) and vinyl carbonate (VC, 2 wt %).

TABLE 1

| Component content [Units: parts by weight] | | Examples 1 | 2 | 3 | 4 | 5 | 6 |
|---|---|---|---|---|---|---|---|
| Positive electrode mixture layer | $LiNi_{0.8}Co_{0.1}Mn_{0.1}O_2$ | 94 | 94 | 94 | 94 | 93.5 | 93 |
| | Carbon black | 2 | 2 | 2 | 2 | 2 | 2 |
| | PVdF | 3 | 3 | 3 | 3 | 3 | 3 |
| | $Li_6CoO_4$ | 1 | 1 | 1 | 1 | 1.5 | 2 |
| | Total content | 100 | 100 | 100 | 100 | 100 | 100 |
| Negative electrode mixture layer | Negative electrode active material (Graphite + $SiO_x$) | 95.5 | 95.5 | 95.5 | 95.5 | 95.5 | 95.5 |
| | Conductive material (Carbon black + SWCNT) | 1 | 1 | 1 | 1 | 1 | 1 |
| | CMC | 1 | 1 | 1 | 1 | 1 | 1 |
| | SBR | 2.5 | 2.5 | 2.5 | 2.5 | 2.5 | 2.5 |
| | Total content | 100 | 100 | 100 | 100 | 100 | 100 |
| | $CR_{Lip}/CR_{Si}$ | 0.3 | 0.167 | 0.067 | 0.05 | 0.125 | 0.1 |

TABLE 2

| Component content [Units: parts by weight] | | Comparative Examples 1 | 2 | 3 | 4 | 5 | 6 | 7 | 8 |
|---|---|---|---|---|---|---|---|---|---|
| Positive electrode mixture layer | $LiNi_{0.8}Co_{0.1}Mn_{0.1}O_2$ | 94 | 95 | 94 | 94 | 94.99 | 88 | 94.99 | 88 |
| | Carbon black | 2 | 2 | 2 | 2 | 2 | 2 | 2 | 2 |
| | PVdF | 3 | 3 | 3 | 3 | 3 | 3 | 3 | 3 |
| | $Li_6CoO_4$ | 1 | 0 | 1 | 1 | 0.01 | 7 | 0.2 | 7 |
| | Total content | 100 | 100 | 100 | 100 | 100 | 100 | 100 | 100 |

TABLE 2-continued

| Component content [Units: parts by weight] | | Comparative Examples 1 | 2 | 3 | 4 | 5 | 6 | 7 | 8 |
|---|---|---|---|---|---|---|---|---|---|
| Negative electrode mixture layer | Negative electrode active material (Graphite + $SiO_x$) | 95.5 (No $SiO_x$) | 95.5 | 95.5 | 95.5 | 95.5 | 95.5 | 95.5 | 95.5 |
| | Conductive material (Carbon black + SWCNT) | 1 | 1 | 1 | 1 | 1 | 1 | 1 | 1 |
| | CMC | 1 | 1 | 1 | 1 | 1 | 1 | 1 | 1 |
| | SBR | 2.5 | 2.5 | 2.5 | 2.5 | 2.5 | 2.5 | 2.5 | 2.5 |
| | Total content | 100 | 100 | 100 | 100 | 100 | 100 | 100 | 100 |
| | $CR_{Lip}/CR_{Si}$ | — | 0 | 2 | 0.02 | 0.01 | 7 | 0.01 | 0.35 |

EXPERIMENTAL EXAMPLE

In order to evaluate the performance of the manufactured electrode assembly according to the present technology, the following experiment was performed.

A) Measurement of Amount of Gas Emission

For the cells manufactured in Examples 1 to 6 and Comparative Examples 1 to 8, an amount of generated oxygen gas was analyzed while charging and discharging was performed once at a temperature of 25° C. under a condition of 0.1 C/0.1 C to proceed formation, and the results are shown in Table 3 below.

B) Evaluation of Electrical Performance

The cells manufactured in Examples 1 to 6 and Comparative Examples 1 to 8 were charged with a charging current of 0.05 C to a charging termination voltage ranging from 4.2 V to 4.25 V at a temperature of 25° C. and charged until a current density reached 0.01 C at a voltage of 0.02 V. Thereafter, charging and discharging ([[≈]] i.e. initial charging/discharging) was performed once by discharging to a termination voltage of 2 V with a discharge current of 0.05 C, and initial efficiencies were calculated according to Equation 1 below by measuring charge/discharge capacities of the cells during the charging and discharging. After the charging/discharging was performed once, 100 cycles were repeated by charging and discharging with a current of 0.5 C, the charge/discharge capacity of the cell was measured in the same manner as in the initial charging/discharging, and, after 100 times of the charging/discharging, a capacity retention rate was calculated according to Equation 2 below. The results are shown in Table 3 below.

Initial efficiency (%)=(discharging capacity at one time/charging capacity at one time)×100    Equation 1

Capacity retention rate (%)=(discharging capacity at 100 times/discharging capacity at one time)×100    Equation 2

TABLE 3

| | $CR_{Lip}/CR_{Si}$ | Generation amount of $O_2$ gas [ml/g] | One cycle charging/discharging Cell capacity [mAh] | One cycle charging/discharging Efficiency [%] | 100 cycles charging/discharging Charging/discharging capacity retention rate [%] |
|---|---|---|---|---|---|
| Example 1 | 0.3 | 101.8 | 50.7 ± 0.2 | 80.6 | 91 |
| Example 2 | 0.167 | 102.1 | 51.6 ± 0.2 | 82.7 | 90 |
| Example 3 | 0.067 | 102.2 | 51.3 ± 0.2 | 81.2 | 92 |
| Example 4 | 0.05 | 102.7 | 50.9 ± 0.2 | 81.1 | 92 |
| Example 5 | 0.125 | 102.8 | 51.6 ± 0.2 | 82.5 | 89 |
| Example 6 | 0.1 | 103.5 | 51.6 ± 0.2 | 82.2 | 88 |
| Comparative Example 1 | — | 102.9 | 50.2 ± 0.2 | 79.8 | 82 |
| Comparative Example 2 | 0 | 24.6 | 51.0 ± 0.2 | 75.2 | 87 |
| Comparative Example 3 | 2 | 102.4 | 51.6 ± 0.2 | 80.7 | 79 |
| Comparative Example 4 | 0.02 | 102.5 | 50.9 ± 0.2 | 79.6 | 85 |
| Comparative Example 5 | 0.01 | 90.9 | 48.6 ± 0.2 | 80.3 | 86 |
| Comparative Example 6 | 7 | 142.6 | 48.8 ± 0.2 | 79.9 | 81 |
| Comparative Example 7 | 0.01 | 98.7 | 49.2 ± 0.2 | 76.4 | 86 |
| Comparative Example 8 | 0.35 | 145.2 | 50.7 ± 0.2 | 81.4 | 84 |

As shown in Table 3, it can be seen that the electrode assemblies of Examples according to the present technology have an effect of improving the performance of the battery.

Specifically, it was shown that the electrode assemblies of Examples had an initial charging/discharging capacity and efficiency that were as high as 50.7 mAh or more and 80.6% or more, respectively, and the cell capacity was maintained at 88% or more even after the charging and discharging were repeated 100 times. In addition, in an electrode assembly for a lithium secondary battery, oxygen gas is generated due to the positive electrode additive according to the following reaction formula, and it was confirmed that the generation amount of the oxygen gas was small in the electrode assemblies of Examples even when the same amount of the positive electrode additive was contained in the positive electrode mixture layer when compared to the electrode assemblies of Comparative Examples.

$$Li_6CoO_4 \longrightarrow Li_4CoO_4 \xrightarrow{O_2\ \text{generation}}$$

$$Li_1CoO_{2.5} \xrightarrow{O_2\ \text{generation}} CoO_2$$

From the above results, in the electrode assembly for a lithium secondary battery according to the present technology, by controlling a ratio $CR_{Lip}/CR_{Si}$ between a content percentage of a positive electrode additive and a Si-containing material that is a negative electrode active material, which are contained in a positive electrode mixture layer and a negative electrode mixture layer, respectively, to a specific range, it is possible to control a rate of reversible and irreversible reactions of lithium ions in the electrode assembly and/or efficiency so that there is an advantage in that high charging/discharging capacity and charging/discharging efficiency can be realized during initial charging/discharging, a capacity retention rate can be excellent during subsequent charging/discharging, and a lithium secondary battery including the electrode assembly can exhibit a high energy density and long lifetime.

Although the above description has been made with reference to exemplary embodiments of the present invention, it should be understood that various alterations and modifications of the present invention can be devised by those skilled in the art to which the present invention pertains without departing from the spirit and scope of the present invention, which are defined by the appended claims.

Therefore, the technical scope of the present invention should not be limited to the contents described in the detailed description of this specification, but should be determined by the scope of the appended claims.

The invention claimed is:

1. An electrode assembly for a lithium secondary battery, comprising:

a positive electrode in which a positive electrode mixture layer includes a positive electrode active material and a positive electrode additive of Chemical Formula 1;

a negative electrode in which a negative electrode mixture layer includes a carbon material and a silicon (Si)-containing material as a negative electrode active material; and a separator located between the positive electrode and the negative electrode, wherein a content of the positive electrode additive ranges from 0.01 to 5 parts by weight based on 100 parts by weight of the positive electrode mixture layer, and a ratio ($CR_{Lip}/CR_{si}$) between a content percentage of the positive electrode additive ($CR_{Lip}$) based on a total weight of the positive electrode mixture layer and a content percentage of the Si-containing material ($CR_{si}$) based on a total weight of the negative electrode mixture layer ranges from 0.03 to 0.30:

$$Li_pCo_{(1-q)}M^1_qO_4 \qquad \text{Chemical Formula 1}$$

in Chemical Formula 1, $M^1$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, Wherein p and q are $5 \le p \le 7$ and $0 \le q \le 0.5$.

2. The electrode assembly of claim 1, wherein the ratio ($CR_{Lip}/CR_{si}$) between the content percentage of the positive electrode additive ($CR_{Lip}$) based on the total weight of the positive electrode mixture layer and the content percentage of the Si-containing material ($CR_{si}$) based on the total weight of the negative electrode mixture layer ranges from 0.05 to 0.20.

3. The electrode assembly of claim 1, wherein the positive electrode additive has a tetragonal structure with a space group of $P4_2/nmc$.

4. The electrode assembly of claim 1, wherein the positive electrode active material is a lithium metal composite oxide of Chemical Formula 2:

$$Li_x[ni_yCo_zMn_wM^2_v]O_u \qquad \text{Chemical Formula 2}$$

in Chemical Formula 2, $M^2$ denotes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and Wherein x, y, z, w, v, and u are $1.0 \le x \le 1.30$, $0 \le y < 0.95$, $0 < z \le 0.5$, $0 < w \le 0.5$, $0 \le v \le 0.2$, and $1.5 \le u \le 4.5$.

5. The electrode assembly of claim 1, wherein the carbon material includes one or more of natural graphite, artificial graphite, graphene, or carbon nanotubes.

6. The electrode assembly of claim 5, wherein the carbon material includes one or more of graphene or carbon nanotubes included in an amount of 0.1 to 10 parts by weight based on 100 parts by weight of a total amount of the carbon material.

7. The electrode assembly of claim 1, wherein the positive electrode mixture layer includes 0.1 to 5 parts by weight of a conductive material based on the total weight of the positive electrode mixture layer.

8. The electrode assembly of claim 1, wherein the positive electrode mixture layer includes one or more conductive materials selected from the group consisting of natural graphite, artificial graphite, carbon black, acetylene black, Ketjen black, and a carbon fiber.

9. The electrode assembly of claim 1, wherein the Si-containing material includes one or more among Si, silicon monoxide (SiO), or silicon dioxide ($SiO_2$).

10. The electrode assembly of claim 1, wherein:

an average thickness of the positive electrode mixture layer ranges from 50 μm to 300 μm; and an average thickness of the negative electrode mixture layer ranges from 100 μm to 300 μm.

11. The electrode assembly of claim 1, wherein an average area ratio of the negative electrode mixture layer and the positive electrode mixture layer ranges from 1.0 to 1.1.

12. A lithium secondary battery comprising the electrode assembly according to claim 1, and an electrolyte.

* * * * *